Patented May 29, 1928.

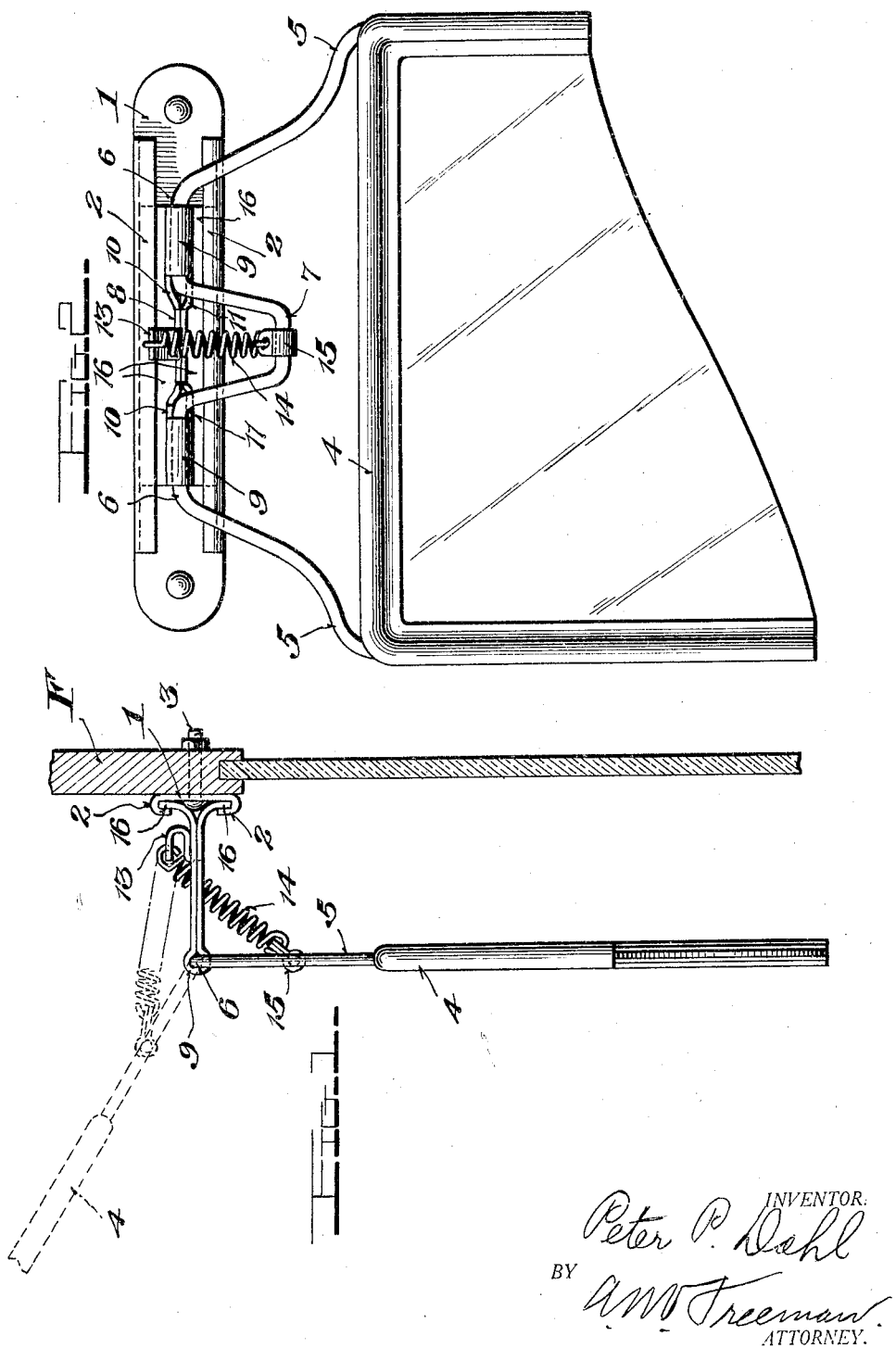

1,671,180

UNITED STATES PATENT OFFICE.

PETER P. DAHL, OF JUNIUS, SOUTH DAKOTA.

GLARE SHIELD.

Application filed June 11, 1927. Serial No. 198,125.

This invention relates to certain new and useful improvements in glare shields, and the primary object thereof is to provide a glare shield which has improved means of a simple and economical form for mounting the shield so that same may be easily and quickly moved from and held in either operative or inoperative position.

In the drawings:—

Fig. 1 is a side edge elevation of the invention applied to a windshield, and

Fig. 2 is a front elevation thereof.

In proceeding in accordance with the present invention, a bracket 1 which may be made of sheet metal is provided and which has inturned side portions 2 that provide a guideway, the bracket being secured to the windshield frame F by fastenings such as bolts 3. The glare shield is formed with a frame 4 and has a wire member 5 attached thereto, the member 5 being formed with a series of undulating portions or loops of which the parts 6 provide pintles and the part 7 a central offset or crank. A support is provided for the windshield which is preferably formed of a sheet metal plate that has a central cut-out portion 8, the plate being doubled upon itself centrally of its ends to form a pair of knuckles 9 in which latter the pintels 6 are pivotally received. The knuckles are cut-away at their inner ends to form a pair of stops 10 and 11, which stops engage the legs of the loop 7 and restrict upward and downward movement of the frame as shown in full and dotted lines in Fig. 1. An integral ear 13 is formed on the plate and has one end of a coil spring 14 connected thereto, the opposite end of the coil spring being connected to a clip 15 which engages the transverse member of the loop 7. The free ends of the sheet metal plate are turned outwardly to provide wings 16 which latter are frictionally and slidably engaged between the inturned sides 2 of the bracket 1.

From the foregoing it will be seen that with the device attached to the windshield, same may be adjusted longitudinally of the windshield and then may be easily and quickly moved from operative to inoperative position or vice versa and is held in either of such positions by the coil spring 14, since, as is apparent from Fig. 1, the crank 7 is disposed on opposite sides of dead center in the extremes of position of the shield and is accordingly held against movement. It will further be observed that the device is not only simple and compact in construction, but involves a minimum of parts. Thus the bracket and the support are formed of sheet metal and the member 5 may be formed of wire which can be easily and quickly bent into the form shown.

What is claimed is:—

1. In a glare shield, a bracket having inturned sides to provide a longitudinal guideway, a glare shield having a wire member at its top formed with a pair of spaced pintle-forming portions and a loop central portion therebetween and offset therefrom, a support for the shield composed of a sheet metal plate having a central opening, doubled upon itself to form a pair of knuckles pivotally receiving the respective pintle-forming portions, a lip integral with the plate and disposed at one end of the opening, and a coil spring connected to said loop and to the lip, the ends of the knuckles being cutaway to provide stops on each of the doubled parts of the plate engageable with the sides of the loop, the ends of the plate being bent outwardly in opposite directions to provide wings that are slidably engaged in the guideway.

2. In a glare shield, a bracket having a guideway, a glare shield frame having a pair of spaced pintles and an offset portion, a support for the frame slidable in the guideway and having knuckles receiving the pintles and having stops to engage the frame and restrict pivotal movement thereof, and a coil spring connected to the offset portion and to the support to hold the frame in either operative or inoperative positions.

3. In a glare shield, a bracket having a guideway, a glare shield frame having a pair of spaced pintles and an offset portion, a support for the frame slidable in the guideway and having knuckles receiving the pintles, and spring means connected to the offset portion and to the support to hold the frame in either operative or inoperative positions.

4. In a glare shield, a bracket, a glare shield having a member at its top formed with a pair of spaced pintle-forming portions and a loop central portion therebetween and offset therefrom, a support for the shield composed of a sheet metal plate having a central opening, doubled upon itself to form a pair of knuckles pivotally receiving the respective pintle-forming portions, means to connect the plate to the bracket and a coil spring connected to said loop and to the plate, the ends of the knuckles being cutaway to provide stops on each of the doubled parts of the plate engageable with the sides of the loop, the ends of the plate being bent outwardly in opposite directions to provide wings that are slidably engaged in the guideway.

5. In a glare shield, a shield having a member formed with a pair of spaced pintle parts and a loop between said parts offset therefrom, a support for the shield composed of a plate having a pair of knuckles pivotally receiving the respective pintle parts, the ends of the knuckles being cutaway to provide stops engageable with side portions of said member, a coil spring connected to the loop and to the plate, and means to secure the plate in position.

6. In a glare shield, a bracket having guides, means to rigidly secure the bracket in position, a plate having parts engaged with the guides so as to be bodily slidable lengthwise of the bracket, a shield, a member carried by the shield, means to pivotally connect the member to the plate, and a spring connected to the plate and to the member whereby to permit the plate and thereby the shield to be slid in either direction lengthwise of the bracket.

In testimony whereof I affix my signature.

PETER P. DAHL.